Figure 1:
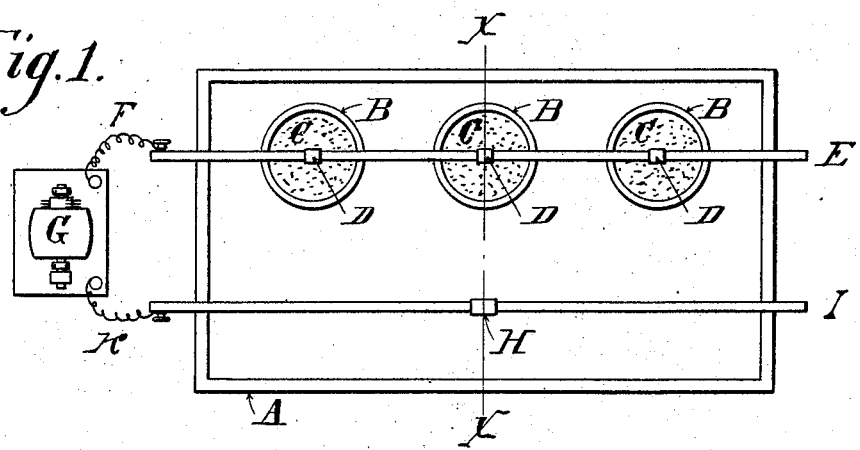

No. 868,769. PATENTED OCT. 22, 1907.
C. H. EHRENFELD & J. R. GROVE.
PROCESS FOR THE RECOVERY OF NICKEL FROM ORE.
APPLICATION FILED JAN. 27, 1906.

WITNESSES:

INVENTORS
Charles Hatch Ehrenfeld
Jacob Ross Grove

UNITED STATES PATENT OFFICE.

CHARLES HATCH EHRENFELD AND JACOB ROSS GROVE, OF YORK, PENNSYLVANIA.

PROCESS FOR THE RECOVERY OF NICKEL FROM ORE.

No. 868,769.  Specification of Letters Patent.  Patented Oct. 22, 1907.

Application filed January 27, 1906. Serial No. 298,107.

*To all whom it may concern:*

Be it known that we, CHARLES HATCH EHRENFELD and JACOB ROSS GROVE, citizens of the United States, residing at York, in the county of York and State of Pennsylvania, have invented certain new and useful Improvements in Processes for the Recovery of Nickel from Ore, of which the following is a specification.

Having invented certain new and useful improvements in methods and processes for the recovery of nickel from ore, we have prepared the following specification particularly describing our invention, so that anyone skilled in the art may be enabled to use the same.

Our invention relates to that class of methods and processes whereby the metal is completely exhausted from the ore and is incorporated into a suitable solution by electrolysis at the anode and is deposited in metallic form upon the cathode.

The object of our invention is to provide a method and process by the use of which nickel may be completely recovered from ore by electrolysis and electric deposition.

Our invention consists in the hereinafter described method of recovering nickel from ore.

It consists, further, in the hereinafter described process for the recovery of nickel from its ores by electrolysis and electric deposition.

Our method consists in thoroughly mixing suitably granulated or crushed ore with a suitable electrolytic solution and then exposing it in a bath of the same solution at the anode while confined subject to the electrolytic action in a manner such that it may be retained in the field of electrolytic action until the metal has been completely exhausted therefrom.

Our process consists in: thoroughly mixing suitably powdered ore with a suitable electrolytic solution; placing the ore thus mixed within a jar of biscuit ware or other suitable porous material within operative electric connection with a conductor of carbon or other suitable material located within the jar; locating the jar within a deposition bath of a solution the same as that contained within the jar so that the jar with its contents constitutes an anode; locating a suitable cathode within operative relation with the anode; and in energizing the circuit and thereby recovering the metal. It is preferable, though not necessary, that the cathode be of metal the same as that to be recovered.

We have found that the solution percolates through the porous vessel, and its contained ore, so slowly that it is impracticable to depend upon its doing so when the vessel and the contained mass of powdered ore are of a size large enough to permit of profitable commercial operations. We have found also, that when the powdered ore is mixed with a quantity of solution sufficient to bring the mixture to a condition approximating semi-fluidity, before the current is passed through it, sufficient of the solution will remain in the mixture during the process of electrolysis to permit of completely exhausting the metal from the ore.

The electric deposition of nickel occurs most advantageously from a solution of a salt of nickel and another base. Accordingly, we employ a solution comprising: a solvent agent, such as, under the electrolytic influence of the current, is capable of dissolving the nickel out of the combination in which it is held in the particular ore we desire to treat; comprising also, another base held, by either the same or another solvent agent, so that together with one or both solvent agents it shall form a salt of nickel and the other base, from which metallic nickel may be electrically deposited. It is obvious that when the second base is held by a second solvent agent, it may be added to the solution subsequently to the commencement of the electrolysis, provided, of course, that it be added prior to the commencement of the deposition. For the recovery of nickel from silicate ores such as genthite, garnierite, and gymnite, a solution may be used composed of water, 80%, sulfuric acid, 10%, and acetate of ammonia, 10%.

We do not desire our claims to be understood as limited to the use of the particular solution herein described, as we have successfully employed other solutions comprising other solvent agents and other bases, in the treatment of various kinds of nickel ores.

We do not desire, that our claims be understood as limited to the application of our invention by means of any particular design of apparatus, as we believe various suitable designs of the same might be devised. We hereinafter describe an apparatus substantially such as we have used in the recovery of different metals from their ores.

In the following description we have referred to the accompanying drawings in which the several parts shown are designated, respectively, by different letters, the same letters being used to indicate the same parts in each of the several figures.

Figure 2:
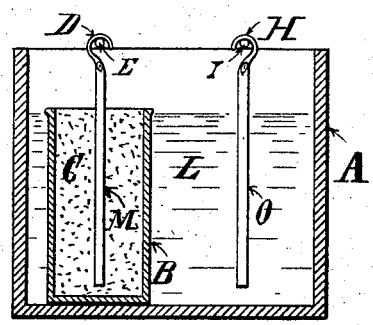

Figure 1 shows the apparatus as seen from above, several jars filled with crushed ore being shown, located in a suitable tank. The upper end of an electric conductor, central in each jar, is shown as suspended from a horizontal electric conductor supported by the ends of the tank, in electric connection with an electric generator. It is intended that this last mentioned conductor be connected with the positive pole of the generator, so that each jar with its contents may act as an anode. The upper end of another suspended conductor, not located within a jar, is shown whereby it depends from a second horizontal conductor also resting upon the ends of the tank. The last mentioned suspended conductor is intended to act as a cathode, the horizontal conducting bar which supports it being shown as electrically connected with the pole of the generator, opposite to that connected with the other horizontal conductor. Fig. 2 shows a vertical section of the tank and contents, on line XX, seen in Fig. 1. In this figure one of the jars is shown in section, its contained ore and central conductor being seen. The cathode also is seen, as is the solution the presence of which is indicated by light horizontal shading lines.

In Fig. 1, A indicates a tank of porcelain, acid-proofed wood, or other suitable material; B indicates the porous jars; C, ore in the jars for treatment; D, curved or hooked portions of rods or plates of carbon or other suitable electric conducting material, by means of which the rods or plates are suspended in electric contact with E, a bar of metal in electric connection by means of wire F with the positive side of a source of electric energy G. H indicates a curved end portion of a cathode of nickel or other suitable material by means of which the cathode is suspended in electric contact with bar I, which is electrically connected by wire K with the negative side of the source of electric energy G.

In Fig. 2, L indicates the solution; M, a rod or plate of carbon, and O, the cathode.

The advantages of our invention are: First—It is less expensive both in cost of installation and in cost of operation than many of the processes and their correlative apparatus for which it is capable of being substituted. Second—It is capable of completely exhausting the metal upon which it is operating, at a single operation, from the ore or matte, while many, if not all of the other processes leave a very considerable residuum after the first operation, which in many instances is irretrievably lost. Third—It renders possible the profitable working of vast deposits of very low grade ores heretofore without commercial value.

What we claim as new and desire to secure by Letters Patent is particularly set forth in the following claims:

1. The process for the recovery of nickel from ore which consists in placing nickel ore within a jar of suitable porous material in operative proximity to an electric conductor within the jar; locating the jar thus charged as an anode in a bath of an aqueous solution of sulfuric acid and a salt of ammonia; locating a suitable cathode within the bath; energizing the circuit and thus recovering the metal.

2. The process for the recovery of nickel from ore which consists in; placing nickel ore within a jar of suitable porous material in operative proximity to an electric conductor within the jar; locating the jar thus charged as an anode within a bath of an aqueous solution comprising an acid solvent agent capable of dissolving the nickel out of the combination in which it is held in the ore and a reagent capable of making the catholyte alkaline on electrolysis; locating a suitable cathode within the bath; energizing the circuit and recovering the metallic nickel upon the cathode.

3. The process for the recovery of nickel from ore which consists is mixing suitably crushed ore with an aqueous solution of sulfuric acid and a salt of ammonia; placing the mixture within a jar of suitable porous material, in operative proximity to an electric conductor within the jar; locating the jar thus charged as an anode in a bath of electrolytic solution of the same composition as that contained in the jar; locating a cathode of nickel within the bath; energizing the circuit and thus recovering the metal.

4. In a process for the recovery of nickel from ore; placing nickel ore within a jar of suitable porous material in operative proximity to an electric conductor within the jar; locating the jar thus charged as an anode in a bath of an aqueous solution comprising an acid solvent agent capable of dissolving the nickel out of the combination in which it is held in the ore and a reagent capable of making the catholyte alkaline on electrolysis.

5. In a process for the recovery of nickel from ore; exposing a mass of nickel ore, removably confined, as an anode in a bath of an aqueous solution comprising an acid solvent agent capable of dissolving the nickel out of the combination in which it is held in the ore and a reagent capable of making the catholyte alkaline on electrolysis.

In testimony whereof we affix our signatures in presence of two witnesses.

CHARLES HATCH EHRENFELD.
JACOB ROSS GROVE.

Witnesses:
NENA M. WAUNER,
N. R. CROSS.